June 27, 1967 R. F. BRODELL 3,327,932
COMPRESSOR BLEED CONTROL
Filed April 21, 1965

INVENTOR
ROBERT F. BRODELL
BY Charles A. Warren
ATTORNEY

United States Patent Office 3,327,932
Patented June 27, 1967

3,327,932
COMPRESSOR BLEED CONTROL
Robert F. Brodell, Glastonbury, Conn., assignor to United Aircraft Corporation, East Hartford, Conn., a corporation of Delaware
Filed Apr. 21, 1965, Ser. No. 449,735
7 Claims. (Cl. 230—114)

ABSTRACT OF THE DISCLOSURE

A bleed valve control wherein a pressure sensitive control is provided, the pressure sensitive control being operative when the bleed valve is open and acting to change the effective pressure acting upon the control mechanism thereby permitting the bleed valve to operate along a predetermined schedule.

---

This invention relates to a bleed valve control for an axial flow compressor.

One feature of the invention is a fluid pressure actuated mechanism by which to control the movement of the bleed valve thereby assuring positive opening and closing of the bleed valve. Another feature is the sensing of the controlling compressor pressures by a control which compares the sensed pressures and in turn activates the bleed valve actuating mechanism thereby requiring very little movement from or energy from the sensing means to obtain fluid pressure actuation.

One feature of the invention is an arrangement for changing the effective pressures sensed by the control device while the bleed valve is open. Thus, the control means which senses compressor pressure may, for example, have a vent when the bleed valve is closed to effectively reduce the sensed pressure at the control, with the vent closed in response to opening of the bleed valve. Another feature is an override of the main control by a pressure signal, such as is given by the main fuel control under high deceleration conditions, for example, or in the event of an after burner "flameout," so that the bleed valve will be immediately opened.

Other features and advantages will be apparent from the specification and claims, and from the accompanying drawing which illustrates an embodiment of the invention.

Figure 1:
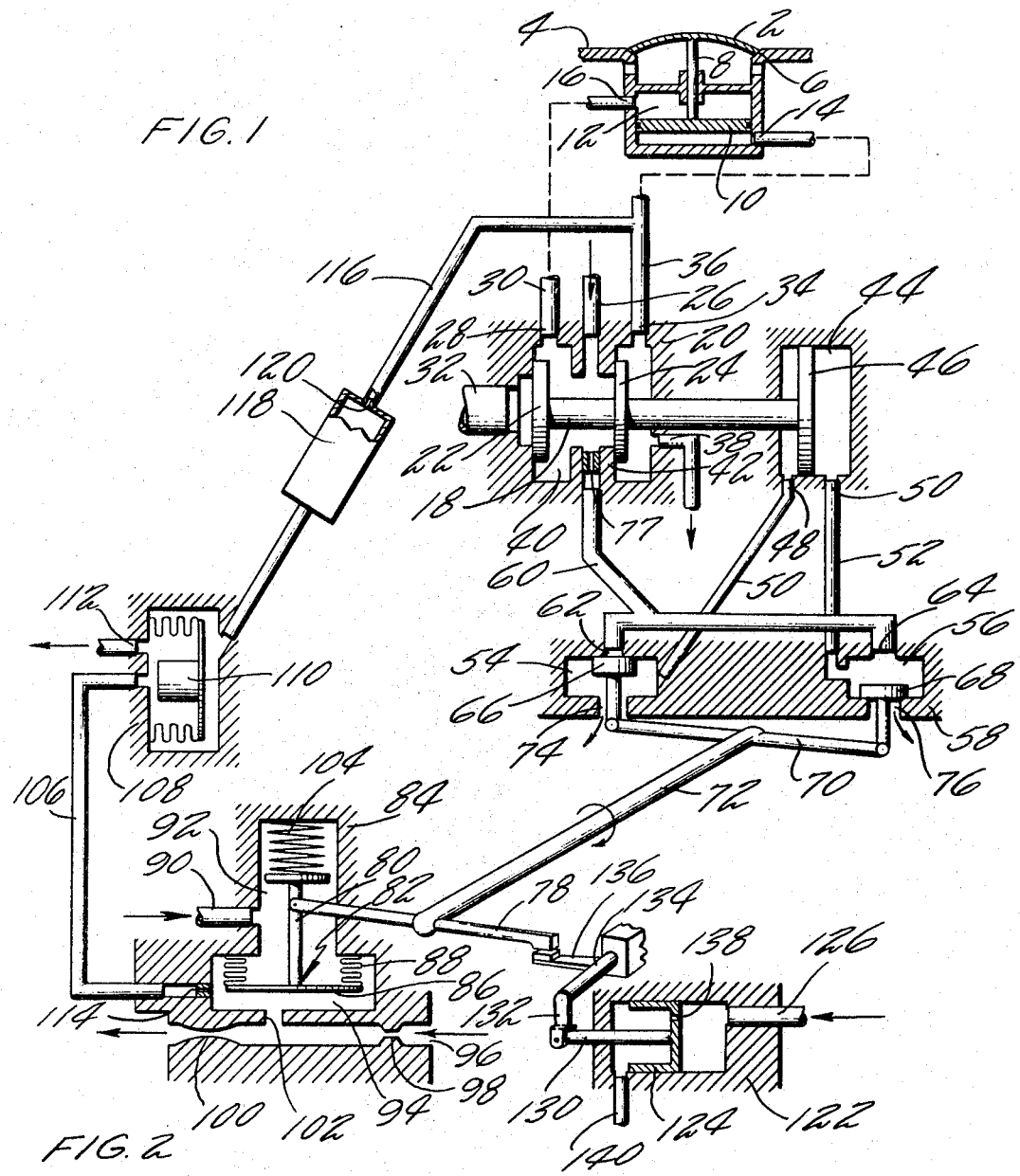
FIG. 1 is a diagrammatic showing of the control.

In the arrangement shown the function of the device is to open or close a bleed valve 2 normally located in the wall 4 of an axial flow compressor. This valve in its open position permits discharge of air from the compressor through the valve port 6 for venting to the atmosphere. A valve of this type is shown and described in application Ser. No. 333,502, filed Dec. 26, 1963, and having the same assignee as the present application. For the purpose of this invention the valve 2 has a valve stem 8 connected to a piston 10 in a cylinder 12. The cylinder below the piston 10 has a port 14 and fluid entering this port will function to move the bleed valve into open position. A port 16 in the cylinder wall above the piston receives fluid under pressure for closing the valve, as will be apparent.

The supply of fluid under pressure selectively to the ports 14 or 16 is under the control of a valve 18 in a valve casing 20. As shown, the valve 18 has spaced discs 22 and 24 thereon with the disc 22 in the position shown providing a fluid connection from a fluid inlet port 26 to an outlet port 28 connected by a conduit 30 to the port 16. At the same time the disc 22 closes a discharge port 32. With the valve 18 in this position, the disc 24 prevents fluid under pressure from the inlet port 26 from entering the port 34 which communicates by way of a conduit 36 to the port 14. The disc 24 in the position shown establishes communication from the port 34 to a vent port 38. As shown, the casing 20 has a chamber 40 in which the two discs are positioned and this chamber has a centrally-located inwardly-projecting flange 42 in which the inlet port 26 is located and with the sides of which the discs 22 and 24 engage respectively.

The valve 18 is moved from the position shown into its opposite position in which the disc 22 engages the flange 42 and the disc 24 closes the vent port 38 by means of an actuating cylinder 44 and piston 46, the latter being mounted on the end of the valve 18. Fluid under pressure is directed alternately to opposite ends of the cylinder 44 through ports 48 and 50 communicating by conduits 50 and 52, respectively, with valve recesses 54 and 56 in a valve casing 58. Fluid under pressure is admitted to the respective valve recesses 54 and 56 by a branched conduit 60 leading from the flange 42 of the valve casing 20 to inlet ports 62 and 64 in the recesses 54 and 56, respectively. These ports are alternately closed by movable valve elements 66 and 68 carried by opposite ends of a lever arm 70 on a shaft 72. In the position shown the valve element 66 closes the port 62 and vents the recess 54 through a vent port 74 thereby venting the left-hand end of the cylinder 44. In the same position of the shaft 72 the valve element 68 closes a vent port 76 and opens the pressure port 64 to supply fluid under pressure through the conduit 52 to the right-hand end of the cylinder 44. When the shaft 72 is turned counterclockwise the position of the valves 66 and 68 is reversed to supply fluid under pressure to the left-hand end of the cylinder 44 and to vent the right-hand end, as will be apparent.

An orifice 77 in the conduit 60 reduces the pressure to the valves 66 and 68 during transient conditions thereby reducing the flow forces on these valves.

The movement of the shaft 72 is responsive to changes in the compressor discharge pressure and compressor inlet pressure and is preferably effected by a change in the ratio of these pressures. The shaft 72 carries a lever arm 78, one end of which is connected to the stem 80 of a pressure sensing element 82 in a casing 84. One end of the stem 80 has a disc 86 attached to a pressure sensing bellows or diaphragm 88. The space above this bellows is subjected to compressor inlet pressure through a port 90 entering the cavity 92 above the bellows. The space 94 below the bellows is subjected to a pressure having a predetermined relation to the compressor discharge pressure. To accomplish this, compressor discharge pressure enters a port 96, passes through a fixed orifice 98 and thence through a venturi 100. Between the orifice and the venturi is a lateral port 102 communicating with the chamber 94. By proper selection of the orifice 98 it will be apparent that the pressure in the space 94 may have the desired functional relationship to the discharge compressor pressure so that, if desired, the movement of the stem 80 will be proportional to the ratio of compressor inlet pressure to compressor discharge pressure. A spring 104 acting on the movable element 82 imposes a bias on the valve element tending to move the shaft 72. This spring may have an adjustment at the end to control the tension, if desired, to change the effective pressure ratio. In the arrangement shown, the pressure sensing means is in a position to have the bleed valve closed, this being the position of the device when the axial flow compressor is being started. As the compressor discharge pressure increases with respect to the inlet pressure and the ratio of these pressures reaches a desired value, the valve element 82 is moved upward into the position shown thereby positioning the valve elements 66 and 68 in the position shown which functions through the valve 18 to move the bleed valve 2 into the closed position shown, this being the normal position of the valve when the compressor is approaching or has reached design speed.

Figure 2:
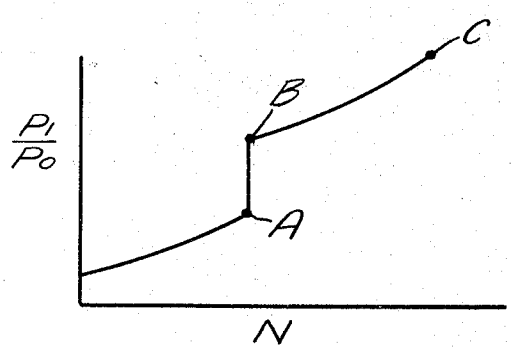
FIG. 2 is a chart of the part of the operation of the control.

The bleed valve 2 normally closes as the compressor is accelerated from start to design speed and this valve closing takes place at a predetermined pressure ratio. When this occurs during acceleration the discharge pressure imemdiately increases without a change in speed, as shown in FIG. 2 in which the pressure ratio of compressor outlet ($P_o$) to compressor inlet ($P_i$) pressure is plotted against speed N where it is assumed that the compressor is operating under constant ambient conditions. Thus, as the compressor is accelerated the line of operation of the compressor reaches a predetermined speed represented by the point A at which the speed and the pressure ratio is such that the control system calls for the bleed valve to be closed. When this occurs, the operating line follows a constant speed to a higher pressure ratio, the point B, and then the line of operation continues to follow the curved line shown until design speed C is reached.

In deceleration the line of operation proceeds from C to B at which point it would be desirable to have the compressor bleeds open, but it is obvious that the sensed pressure ratio is that represented by the point B rather than the point A at which ratio the bleed would normally be opened. In order that the bleed may open at the right point, the device is arranged to give a reduced pressure signal to accomplish this purpose. As shown, the chamber 94 below the diaphragm 86 is connected by a conduit 106 to a valve housing 108. This housing encloses a pressure responsive valve element 110 and closes the end of the conduit 106 and prevents this conduit from venting through the vent port 112. When the compressor is operating between points B and C on the curve, with bleed closed, the valve 110 is in the open position shown and venting takes place for the chamber 94 limited by an orifice 114 in the conduit 106. This arrangement permits the pressure to be enough lower in the chamber 94 to cause turning of the shaft 72 at the point B on the curve for opening the bleed valve.

As soon as the bleed valve is open, fluid under pressure from the conduit 36, which communicates with the open side of the bleed valve through a conduit 116 and a chamber 118 to the valve casing 108, is in a position for closing the valve 110 thus restoring the across pressure bellows 38 to the proper ratio for controlling the remainder of the deceleration of the compressor along the line from the point A to the start of the curve. If no limit were incorporated in the response of the valve 110 for admission of fluid under pressure upon opening the bleed valve, the response of the valve 110 might be too prompt causing cycling of the control. Accordingly, the chamber 118 provides a short delay which is increased by the further use of an orifice 120 on the inlet to the chamber 118. With this arrangement, the compressor will be operating below the point A on the curve before the valve 110 is closed and above point B before valve 110 is opened.

Where this device is used for controlling the bleeds on the compressor of a turbojet engine equipped with an afterburner, it has been found desirable to have the bleed valve open during certain operations of the device as, for example, when the engine is decelerating at an unusually high rate or when a burnout has occurred in the afterburner. When either of these events occurs, there is within the main fuel control a high pressure signal and this high pressure signal is used to cause immediate opening of the bleed valve. To accomplish this purpose the device of the invention includes a cylinder 122 having a piston 124 therein and the end of the cylinder receives the high pressure signal through a port 126. If a high pressure signal is supplied to the cylinder 122 projecting piston rod 130 acts through an arm 132 and a shaft 134 to which it is attached to move a projecting arm 136 that engages with the end of lever arm 78 to move the latter in a position to procure immediate opening of the bleed valve. When no pressure signal is suplied to the cylinder 122 any pressure therein is vented through a restricting orifice 138 in the cylinder to a vent permitting fuel flow for the purpose of cooling this unit if so desired.

It is to be understood that the invention is not limited to the specific embodiment herein illustrated and described, but may be used in other ways without departure from its spirit as defined by the following claims.

I claim:

1. A bleed control for a multistage axial flow compressor including a bleed valve, pressure responsive means for actuating said valve, control means responsive to compressor pressures at different stages upstream and downstream of the bleed valve for actuating said pressure responsive means in response to changes in the sensed pressures, said control means including a pressure sensing element and a vent for reducing the pressure on one side of said pressure sensing element, and a pressure sensitive control in communication with said pressure responsive means and said control means, said pressure sensitive control including a pressure delay means to prevent cycling of said control and a means responsive to the opening of the bleed valve, said means being in cooperation with said vent for causing the side of said pressure sensing element to sense a different effective pressure than when the bleed valve is closed.

2. A bleed control as in claim 1 in which other means responsive to a high pressure signal overrides the control means and causes opening of the bleed valve.

3. A bleed control as in claim 1 in which the effective compressor discharge pressure sensed by the pressure sensing means is adjusted in response to opening of the bleed valve.

4. A bleed control as in claim 1 in which the admission of fluid under pressure to said cylinder for opening the bleed valve adjusts the effective outlet pressure sensed by the pressure sensing means to decrease the actual outlet pressure at which the sensing means will subsequently cause closing of the bleed valve.

5. A bleed control for an axial flow compressor including a movable element, pressure responsive means for moving said element including a first piston connected to said element and a cylinder for the first piston, valve means for admitting fluid under pressure to said cylinder for actuating said element, said valve means including a second piston connected to said valve means and a cylinder for the second piston, control means responsive to pressure changes within the compressor for actuating said valve means, said control means including a pressure sensing means responsive to the pressures in the compressor which is moved by changes in these pressures and valve elements moved by said pressure sensing means to control the admission of actuating fluid to said second piston and a vent for reducing the pressure on one side of said pressure sensing element, and a pressure sensitive control which communicates with said pressure responsive means and said pressure sensing means, said pressure sensitive control including a pressure delay means to prevent cycling of said control and means responsive to the opening of the bleed valve, said means being in cooperation with said vent for causing the side of said pressure sensing element to sense a different effective pressure than when the bleed valve is closed.

6. A bleed control as in claim 5 wherein the pressure on one side of the pressure sensing means is controlled by an orifice and venturi acting in series.

7. A bleed control as in claim 6 in which other means responsive to a high pressure signal overrides the control means and causes opening of the bleed valve.

(References on following page)

References Cited
UNITED STATES PATENTS

| | | | |
|---|---|---|---|
| 2,398,619 | 4/1946 | Clark et al. | 230—115 |
| 2,837,269 | 6/1958 | Torell | 230—114 |
| 2,863,601 | 12/1958 | Torell | 230—114 |
| 2,965,285 | 12/1960 | Schorn et al. | 230—114 |
| 2,978,166 | 4/1961 | Hahn | 230—115 |
| 3,137,210 | 6/1964 | Gavin | 230—114 |
| 3,219,309 | 11/1965 | Alberan | 230—114 X |

ROBERT M. WALKER, *Primary Examiner.*